(12) United States Patent
Nonnet

(10) Patent No.: US 11,472,743 B2
(45) Date of Patent: Oct. 18, 2022

(54) SINTERED ZIRCON BEADS

(71) Applicant: SAINT-GOBAIN CENTRE DE RECHERCHES ET D'ETUDES EUROPEEN, Courbevoie (FR)

(72) Inventor: Emmanuel Nonnet, Saint-Saturnin les Avignon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 16/630,985

(22) PCT Filed: Jul. 18, 2018

(86) PCT No.: PCT/EP2018/069519
§ 371 (c)(1),
(2) Date: Jan. 14, 2020

(87) PCT Pub. No.: WO2019/016270
PCT Pub. Date: Jan. 24, 2019

(65) Prior Publication Data
US 2020/0223755 A1    Jul. 16, 2020

(30) Foreign Application Priority Data
Jul. 20, 2017    (FR) ...................................... 1756893

(51) Int. Cl.
*C04B 35/109*    (2006.01)

(52) U.S. Cl.
CPC .... *C04B 35/109* (2013.01); *C04B 2235/3206* (2013.01); *C04B 2235/3225* (2013.01); *C04B 2235/3229* (2013.01); *C04B 2235/3418* (2013.01)

(58) Field of Classification Search
CPC .......... C04B 35/109; C04B 2235/3206; C04B 2235/3225; C04B 2235/3229; C04B 2235/3418
See application file for complete search history.

(56) References Cited

FOREIGN PATENT DOCUMENTS

| FR | 2882749 A1 | 9/2006 | |
|---|---|---|---|
| FR | 2929941 A1 | 10/2009 | |
| FR | 2978143 A1 * | 1/2013 | ........... C04B 35/481 |
| FR | 2978143 A1 | 1/2013 | |
| WO | 2011/077380 A2 | 6/2011 | |
| WO | 2013/011436 A1 | 1/2013 | |
| WO | WO-2013011436 A1 * | 1/2013 | ........... C04B 35/481 |

OTHER PUBLICATIONS

International Search Report from corresponding International Application PCT/EP2018/069519 dated Oct. 8, 2018, 7 pages.

* cited by examiner

*Primary Examiner* — Karl E Group
*Assistant Examiner* — Cameron K Miller
(74) *Attorney, Agent, or Firm* — Ronald M. Kachmarik; Cooper Legal Group LLC

(57) ABSTRACT

A sintered bead with the following crystal phases, in percentages by mass based on crystal phases: 25%≤zircon, or "$Z_1$", ≤94%; 4%≤stabilized zirconia+stabilized hafnia, or "$Z_2$", ≤61%; monoclinic zirconia+monoclinic hafnia, or "$Z_3$"≤50%; corundum≤57%; crystal phases other than $Z_1$, $Z_2$, $Z_3$ and corundum<10%; the following chemical composition, in percentages by mass based on oxides: 33%≤$ZrO_2$+$HfO_2$, or "$Z_4$"≤83.4%; $HfO_2$≤2%; 10.6%≤$SiO_2$≤34.7%; $Al_2O_3$≤50%; 0%≤$Y_2O_3$, or "$Z_5$"; 0%≤$CeO_2$, or "$Z_6$"; 0.3%≤$CeO_2$+$Y_2O_3$≤19%, provided that (1) $CeO_2$+3.76*$Y_2O_3$≥0.128*Z, and (2) $CeO_2$+1.3*$Y_2O_3$≤0.318*Z, with $Z=Z_4+Z_5+Z_6-(0.67*Z_1*(Z_4+Z_5+Z_6)/(0.67*Z_1+Z_2+Z_3))$; MgO≤5%; CaO≤2%; oxides other than $ZrO_2$, $HfO_2$, $SiO_2$, $Al_2O_3$, MgO, CaO, $CeO_2$ and $Y_2O_3$<5.0%.

42 Claims, No Drawings

SINTERED ZIRCON BEADS

TECHNICAL FIELD

The present invention relates to sintered zircon beads, to a process for manufacturing these beads, and the use of these beads as grinding agents, wet dispersion agents or for surface treatment.

PRIOR ART

The paint, ink, dye, magnetic lacquer and agrochemical compound industries also use beads for the dispersion and homogenization of liquid and solid components.

The mineral industry uses beads for the fine grinding of materials that may be pre-ground dry by traditional processes, in particular for the fine grinding of calcium carbonate, titanium oxide, gypsum, kaolin and iron ore.

The field of microgrinding uses rounded sand, glass beads, metal beads and ceramic beads.

- Rounded sand, such as OTTAWA sand, for example, is a natural, inexpensive product but it is unsuitable for modern, pressurized, high-flow mills. Indeed, the sand is not very resistant, of low density, variable in quality and abrasive for the material.
- Glass beads, which are widely used, have better strength, lower abrasiveness and availability in a wider range of diameters.
- Metal beads, particularly steel beads, have a low inertia towards the treated products, leading in particular to pollution of mineral fillers and graying of paints, and an excessive density requiring special crushers. They involve in particular high energy consumption, high heating and high mechanical stress on the equipment.
- Ceramic beads have better resistance than glass beads, higher density and excellent chemical inertia.

The beads typically have a size between 0.005 and 10 mm.

It is possible to distinguish between:
- molten ceramic beads, generally obtained by melting ceramic components, forming spherical droplets from the molten material, then solidifying said droplets, and
- sintered ceramic beads, generally obtained by cold forming a ceramic powder and then consolidating it by high-temperature firing.

Unlike sintered beads, molten beads usually have a very abundant intergranular glassy phase that fills a network of crystallized grains. The problems encountered in their respective applications by sintered and molten beads, and the technical solutions adopted to solve them, are therefore generally different. Moreover, due to the significant differences between manufacturing processes, a composition developed to produce a molten bead is not a priori suitable for producing a sintered bead, and vice versa.

In order to serve all the markets described above, the beads must simultaneously have good wear resistance and high density.

One purpose of the invention is to provide beads that meet these constraints.

SUMMARY OF THE INVENTION

The invention relates to a sintered bead, with:
the following crystal phases, in percentages by mass based on crystal phases and for a total of 100%:
25%≤zircon, or "$Z_1$"≤94%;
4%≤stabilized zirconia+stabilized hafnia, or "$Z_2$"≤61%;
monoclinic zirconia+monoclinic hafnia, or "$Z_3$"≤50%;
corundum 57%;
crystal phases other than $Z_1$, $Z_2$, $Z_3$ and corundum<10%;
the following chemical composition, in percentages by mass based on oxides and for a total of 100%:
33%≤$ZrO_2$+$HfO_2$, or "$Z_4$"≤83.4%;
$HfO_2$≤2%;
10.6%≤$SiO_2$≤34.7%;
$Al_2O_3$≤50%;
0%≤$Y_2O_3$, or "$Z_5$";
0%≤$CeO_2$, or "$Z_6$";
0.3%≤$CeO_2$+$Y_2O_3$≤19%, provided that
(1) $CeO_2$+3.76*$Y_2O_3$≥0.128*Z, and
(2) $CeO_2$+1.3*$Y_2O_3$≤0.318*Z,
with $Z=Z_4+Z_5+Z_6-(0.67*Z_1*(Z_4+Z_5+Z_6)/(0.67*Z_1+Z_2+Z_3))$;
MgO≤5%;
CaO≤2%;
oxides other than $ZrO_2$, $HfO_2$, $SiO_2$, $Al_2O_3$, MgO, CaO, $CeO_2$ and $Y_2O_3$<5.0%.

In an embodiment, the sintered bead has:
the following crystal phases, in percentages by mass based on crystal phases and for a total of 100%:
31%≤zircon, or "$Z_1$"≤94%;
4% stabilized zirconia+stabilized hafnia, or "$Z_2$"≤61%;
monoclinic zirconia+monoclinic hafnia, or "$Z_3$"≤50%;
corundum≤40%;
crystal phases other than $Z_1$, $Z_2$, $Z_3$ and corundum<10%;
the following chemical composition, in percentages by mass based on oxides and for a total of 100%:
37%≤$ZrO_2$+$HfO_2$, or "$Z_4$"≤83.4%;
$HfO_2$≤2%;
12.6%≤$SiO_2$≤34.7%;
$Al_2O_3$≤35%;
0%≤$Y_2O_3$, or "$Z_5$";
0%≤$CeO_2$, or "$Z_6$";
0.3%≤$CeO_2$+$Y_2O_3$≤19%, provided that
(3) $CeO_2$+3.76*$Y_2O_3$≥0.128*Z, and
(4) $CeO_2$+1.3*$Y_2O_3$≤0.318*Z,
with $Z=Z_4+Z_5+Z_6-(0.67*Z_1*(Z_4+Z_5+Z_6)/(0.67*Z_1+Z_2+Z_3))$;
MgO≤5%;
CaO≤2%;
oxides other than $ZrO_2$, $HfO_2$, $SiO_2$, $Al_2O_3$, MgO, CaO, $CeO_2$ and $Y_2O_3$<5.0%.

As will be discussed in greater detail below in the description, the inventors discovered, unexpectedly, that this combination of features significantly improves wear resistance properties while providing high density.

The sintered beads according to the invention are therefore particularly well suited for wet dispersion, microgrinding, heat exchange and surface treatment applications.

A sintered bead according to the invention may also have one or more of the following optional features:
- the $ZrO_2$+$HfO_2$ content is greater than or equal to 31%, preferably greater than 35%, preferably greater than 40%, preferably greater than 45%, preferably greater than 50%, and/or less than 80%, preferably less than 75%, preferably less than 70%, in percentages by mass based on oxides;
- the $SiO_2$ content is greater than or equal to 12.6%, preferably greater than 14%, preferably greater than 15%, and/or less than 30%, preferably less than 25%, in percentages by mass based on oxides;

the ratio of $ZrO_2+HfO_2$ content to $SiO_2$ content is greater than 1.2, preferably greater than 1.5, preferably greater than 2, preferably greater than 2.2, preferably greater than 2.5 and/or less than 5, preferably less than 4.5, preferably less than 4, preferably less than 3.5;

the $Al_2O_3$ content is greater than 5%, preferably greater than 10%, and/or less than 40%, preferably less than or equal to 35%, preferably less than 30%, preferably less than 25%, preferably less than 20%, in percentages by mass based on oxides. Advantageously, the density of the bead is improved;

the MgO content is greater than 0.1%, preferably greater than 0.15%, or even greater than 0.2%, or even greater than 0.3%, and/or less than 4%, preferably less than 3%, preferably less than 2%, preferably less than 1.5%, preferably less than 1%, in percentages by mass based on oxides;

the CaO content is greater than 0.1%, preferably greater than 0.2%, preferably greater than 0.3%, and/or less than 1.5%, preferably less than 1%, in percentages by mass based on oxides;

the $CeO_2+Y_2O_3$ content is greater than 0.65%, preferably greater than 0.95%, preferably greater than 1.3%, preferably greater than 1.6%, preferably greater than 1.95%, preferably greater than 2.2%, preferably greater than 3%, in percentages by mass based on oxides;

the chemical composition is such that $CeO_2+3.4*Y_2O_3 \geq 0.16*Z$, preferably $CeO_2+2.89*Y_2O_3 \geq 0.185*Z$, preferably $CeO_2+2.39*Y_2O_3 \geq 0.212*Z$, preferably $CeO_2+1.84*Y_2O_3 \geq 0.224*Z$, preferably $CeO_2+1.76*Y_2O_3 \geq 0.229*Z$;

the $CeO_2+Y_2O_3$ content is less than 15.5%, preferably less than 14.3%, preferably less than 11.6%, in percentages by mass based on oxides;

the chemical composition is such that $CeO_2+1.4*Y_2O_3 \leq 0.259*Z$;

in a preferred embodiment, the $CeO_2$ content is less than 0.2%, preferably less than 0.1%, preferably substantially zero;

the chemical composition is such that $Y_2O_3 \geq 1.82*Z$, preferably $Y_2O_3 \geq 3.44*Z$, preferably $Y_2O_3 \geq 5.38*Z$;

the content of oxides other than $ZrO_2$, $HfO_2$, $SiO_2$, $Al_2O_3$, $Y_2O_3$, $CeO_2$, CaO, MgO is less than 4%, preferably less than 3%, preferably less than 2%, or even less than 1.5%, or even less than 1%, in percentages by mass based on oxides. Preferably, the $Na_2O$ content is less than 0.8%, preferably less than 0.5%, preferably less than 0.3%, preferably less than 0.2% and/or the $K_2O$ content is less than 0.8%, preferably less than 0.5%, preferably less than 0.3%, preferably less than 0.2%;

oxides other than $ZrO_2$, $HfO_2$, $SiO_2$, $Al_2O_3$, $Y_2O_3$, $CeO_2$, CaO, MgO are impurities;

preferably, the oxide content of a bead according to the invention represents more than 99%, preferably more than 99.5%, preferably more than 99.9%, and preferably still substantially 100% of the total mass of said bead;

the zircon ($ZrSiO_4$ phase) content, in percentage by mass based on the total amount of crystal phases, is greater than or equal to 31%, preferably greater than 35%, preferably greater than 40% and/or less than 90%, preferably less than 85%, preferably less than 80%, preferably less than 76%, preferably less than 72%, preferably less than 68%;

the stabilized zirconia ($ZrO_2$ phase)+hafnia ($HfO_2$ phase) content, in percentage by mass based on the total amount of crystal phases, is greater than 5%, preferably greater than 8%, preferably greater than 10%, preferably greater than 12%, preferably greater than 15%, preferably greater than 18%, preferably greater than 20%, preferably greater than 24%, preferably greater than 27% and/or lesser than 55%, preferably less than 50%, preferably less than 47%;

the monoclinic zirconia ($ZrO_2$ phase)+hafnia ($HfO_2$ phase) content, in percentage by mass based on the total amount of crystal phases, is less than 45%, preferably less than 40%, preferably less than 35%, preferably less than 35%, preferably less than 30%, preferably less than 25%, preferably less than 20%, preferably less than 15%, preferably less than 10%, preferably less than 5%, preferably substantially zero;

the corundum ($Al_2O_3$ phase) content, in percentage by mass based on the total amount of crystal phases, is greater than 5%, preferably greater than 10% and/or less than 50%, preferably less than or equal to 40%, preferably less than 35%, preferably less than 30%, preferably less than 25%, preferably less than 20%;

the content of "other crystal phases", i.e. crystal phases other than zircon, stabilized zirconia, stabilized hafnia, stabilized zirconia, monoclinic hafnia and corundum, in percentage by mass based on the total amount of crystal phases, is less than 8%, preferably less than 6%, or even less than 5%, or even less than 4%;

the "other crystal phases" are, for more than 90%, more than 95%, substantially 100% by mass, mullite and/or cristobalite;

in an embodiment, the mullite content is not detectable with the measurement method described for the examples;

the mass amount of amorphous phase, i.e. glassy phase, in percentage by mass based on the mass of the bead is less than 25%, preferably less than 20%, preferably less than 17%;

the amorphous phase, expressed as oxide, comprises MgO and $SiO_2$, and/or $Y_2O_3$ and/or $Al_2O_3$ and/or CaO and/or $Na_2O$ and/or $K_2O$ and/or $K_2O$ and/or $P_2O_5$;

the amorphous phase, expressed as oxide, comprises MgO and $SiO_2$ and $Y_2O_3$ and $Al_2O_3$ and $Na_2O$ and $K_2O$ and $P_2O_5$;

the total porosity is less than 6%, preferably less than 5.5%, preferably less than 5%, preferably less than 4.5%, or even less than 4%, or even less than 3%, or even less than 2%;

the sintered bead has a size of less than 10 mm, preferably less than 2.5 mm and/or more than 0.005 mm, preferably more than 0.5 mm;

the sintered bead has a sphericity greater than 0.7, preferably greater than 0.8, preferably greater than 0.85 or even greater than 0.9;

the density of the sintered bead is greater than 4.2 g/cm³, preferably greater than 4.3 g/cm³, or even greater than 4.4 g/cm³ and/or less than 4.9 g/cm³, preferably less than 4.8 g/cm³.

In a preferred embodiment, a sintered bead according to the invention, most preferably, has:

the following crystal phases, in percentages by mass based on crystal phases and for a total of 100%:
31%≤zircon≤68%;
25%≤stabilized zirconia+stabilized hafnia≤47%;
monoclinic zirconia+monoclinic hafnia≤5%;
4%≤corundum≤25%;

crystal phases other than zircon, stabilized zirconia, stabilized hafnia, stabilized zirconia, monoclinic hafnia and corundum<5%;

the following chemical composition, in percentages by mass based on oxides and for a total of 100%:

$50\% \leq ZrO_2 + HfO_2 \leq 70\%$;
$HfO_2 \leq 2\%$;
$15\% \leq SiO_2 \leq 25\%$;
$5\% \leq Al_2O_3 \leq 20\%$;
$3\% \leq Y_2O_3 \leq 8.3\%$;
$CeO_2 \leq 0.1\%$;
$0.1\% \leq MgO \leq 1\%$;
$0.3\% \leq CaO \leq 1\%$;

less than 3% oxides other than $ZrO_2$, $HfO_2$, $SiO_2$, $Al_2O_3$, MgO, CaO, $CeO_2$ and $Y_2O_3$.

In this embodiment, the sintered bead has preferably, less than 25% amorphous phase based on the mass of the bead, and a total porosity less than or equal to 6%.

Preferably, the $CeO_2$ content is substantially zero.

The invention also relates to a bead powder comprising more than 90%, preferably more than 95%, preferably substantially 100%, in percentages by mass, of beads according to the invention.

The invention also relates to a process for manufacturing sintered beads according to the invention comprising the following successive steps:

a) optionally, grinding one or more raw material powders, preferably by co-grinding, and dosing said optionally ground raw material powders, so as to obtain a particulate mixture having a median size of less than 0.6 μm, and a composition suitable for obtaining, at the end of step g), sintered beads having a composition in accordance with that of a sintered bead according to the invention, the particulate mixture comprising zircon particles, stabilized zirconia particles and particles of a glass containing MgO and/or $SiO_2$, and/or particles of a glass-ceramic containing MgO and/or particles of a compound comprising MgO and $SiO_2$, and/or powders of precursors of these oxides, b) optionally, drying said particulate mixture, c) preparing a starting feed from said particulate mixture, optionally dried, d) shaping the starting feed in the form of raw beads, e) optionally, washing, f) optionally, drying, g) sintering at a sintering temperature above 1330° C. and below 1450° C. to obtain sintered beads.

Finally, the invention relates to the use of a bead powder according to the invention, in particular manufactured according to a process according to the invention, as grinding agents; wet dispersion agents; propping agents, in particular to prevent the closure of deep geological fractures created in the walls of an extraction well, in particular oil; heat exchange agents, for example for fluidized bed; or for surface treatment.

Definitions

A sum of oxide contents or crystal phases (i.e. a formula in which these contents are linked by the sign "+") does not imply that the two oxides or crystal phases linked by this sign "+" are necessarily present simultaneously.

"Particulate" refers to a solid product that is individualized in a powder.

"Sintering" is the consolidation by heat treatment at more than 1100° C. of a raw particle (granular agglomerate), with possible partial or total melting of some (but not all) of its components.

"Bead" means a particle with a sphericity, i.e. a ratio between its smaller Feret diameter and its larger Feret diameter, greater than 0.6, regardless of how this sphericity was obtained. Preferably the beads according to the invention have a sphericity greater than 0.7.

The "size" of a bead is its smaller Feret diameter.

The "median size" of a powder of raw material particles, generally denoted $D_{50}$, is the size dividing the particles of this powder into first and second populations equal in mass, these first and second populations comprising only particles with a size larger than or smaller than the median size, respectively. The median size can be estimated, for example, using a laser granulometer.

"Sintered bead" means a solid bead obtained by sintering a raw bead.

"Impurities" means the inevitable constituents, necessarily introduced with the raw materials. In particular, in an embodiment, compounds belonging to the group of oxides, nitrides, oxynitrides, carbides, oxycarbides, sodium and other alkali carbonitrides, iron, vanadium and chromium are impurities. Examples include $Fe_2O_3$ and $TiO_2$. The residual carbon is one of the impurities in the composition of the particles according to the invention.

Where reference is made to $ZrO_2$ or ($ZrO_2+HfO_2$), this is understood to mean $ZrO_2$ and less than 2% $HfO_2$, in percentage by mass based on $ZrO_2+HfO_2$. Indeed, some $HfO_2$, chemically inseparable from $ZrO_2$ and having similar properties, is always naturally present in $ZrO_2$ sources at levels generally below 2%, in mass percentage based on $ZrO_2+HfO_2$. Hafnium oxide is not considered an impurity.

A "precursor" of an oxide is a constituent capable of supplying said oxide during the manufacture of a bead according to the invention.

"Stabilized zirconia" means zirconia in a quadratic and/or cubic crystallographic form.

For clarity, the terms "$ZrO_2$", "$HfO_2$", "$SiO_2$" and "$Al_2O_3$" are used to refer to the contents of these oxides in the composition, and "zirconia", "hafnia" and "corundum" to refer to crystal phases of these oxides consisting of $ZrO_2$, $HfO_2$, $SiO_2$ and $Al_2O_3$, respectively. However, these oxides may also be present in other phases. In particular, $ZrO_2$ and $SiO_2$ may be present as zircon ($ZrSiO_4$).

All percentages in the present description are percentages by mass based on oxides, unless otherwise stated.

All features of the beads can be measured according to the protocols described for the examples.

The terms "containing a", "comprising a" or "including a" should be interpreted broadly, without limitation, unless otherwise specified.

DETAILED DESCRIPTION

To manufacture sintered beads according to the invention, steps a) to g) described above and detailed below can be carried out.

In step a), the raw material powders may be ground individually or, preferably, co-ground, if their mixture in proportions suitable for the manufacture of beads according to the invention does not lead to a particle mixture with a median size of less than 0.6 μm. This grinding can be wet grinding.

Preferably, grinding or co-grinding will be carried out in such a way that the median size of said particulate mixture is less than 0.5 µm, preferably less than 0.4 µm.

Preferably, the powders used, in particular powders of zircon $ZrSiO_4$, of stabilized zirconia $ZrO_2$, optionally of alumina $Al_2O_3$, of glass containing MgO and/or $SiO_2$, and/or of glass-ceramic containing MgO, and/or of compound containing MgO and $SiO_2$, each have a median size of less than 5 µm, or even less than 3 µm, less than 1 µm, less than 0.7 µm, preferably less than 0.6 µm, preferably less than 0.5 µm, or even less than 0.4 µm. Advantageously, when each of these powders has a median size of less than 0.6 µm, preferably less than 0.5 µm, or even less than 0.4 µm, grinding is optional.

In a process according to the invention, the particulate mixture comprises powders of zircon $ZrSiO_4$, of stabilized zirconia $ZrO_2$, of glass containing MgO and/or $SiO_2$, and/or of glass-ceramic containing MgO and/or of a compound containing MgO and $SiO_2$, and optionally alumina $Al_2O_3$ powder.

These powders may also be replaced, at least partially, by powders of precursors of these oxides, introduced in equivalent amounts.

Preferably, the zircon powder used has a specific area, calculated by the BET method, greater than 5 $m^2/g$, preferably greater than 8 $m^2/g$, preferably greater than 10 $m^2/g$, and/or less than 30 $m^2/g$. Advantageously, the grinding in step a), generally in suspension, is facilitated. In addition, the sintering temperature in step f) can be reduced.

Preferably, the stabilized zirconia powder used has a specific area, calculated by the BET method, greater than 0.5 $m^2/g$, preferably greater than 1 $m^2/g$, preferably greater than 1.5 $m^2/g$, and/or less than 20 $m^2/g$, preferably less than 18 $m^2/g$, preferably less than 15 $m^2/g$. Advantageously, the grinding in step a), generally in suspension, is facilitated. In addition, the sintering temperature in step f) can be reduced.

Preferably, the alumina powder used has a median size of less than 7 µm, preferably less than 6 µm, or even less than 3 µm, or even less than 2 µm, or even less than 1.5 µm.

In step (b), optional, the ground raw material powders are dried, for example in an oven or by spraying, especially if they have been obtained by wet grinding. Preferably, the temperature and/or duration of the drying step is adjusted so that the residual moisture of the raw material powders is less than 2% or even less than 1.5%.

In step c), a starting feed is prepared, preferably at room temperature.

The starting feed contains a zircon powder, i.e. $ZrSiO_4$ particles, in an amount greater than 35%, preferably greater than 40%, and/or less than 94%, preferably less than 90%, preferably less than 85%, preferably less than 80%, preferably less than 76%, preferably less than 72%, preferably less than 68% by mass based on the mass of the starting feed.

The starting feed contains a powder of particles simultaneously comprising $ZrO_2$, $HfO_2$, and $Y_2O_3$ and $CeO_2$ in an amount capable of stabilizing zirconia, preferably in an intimate mixture, preferably stabilized zirconia particles, i.e. $Y_2O_3$- and/or $CeO_2$-stabilized $ZrO_2$ particles, in an amount greater than 5%, preferably greater than 10%, preferably greater than 15%, preferably greater than 20%, preferably greater than 25%, and/or less than 60%, preferably less than 55%, preferably less than 50%, by mass based on the mass of the starting feed.

Preferably, the stabilized zirconia powder is a $Y_2O_3$-stabilized zirconia powder and contains substantially no $CeO_2$.

Preferably, the stabilized zirconia powder is stabilized in cubic crystallographic form. Surprisingly, the inventors discovered that the wear resistance of the beads is greatly improved.

In a first preferred embodiment, the stabilized zirconia powder is a zirconia powder stabilized in cubic crystallographic form using $Y_2O_3$ and contains substantially no $CeO_2$. In said embodiment, the molar content of $Y_2O_3$ is between 7.5 mol % and 11 mol %, based on the total content of $ZrO_2$, $Y_2O_3$ and $CeO_2$.

In a second preferred embodiment, the starting feed contains an alumina powder, i.e. $Al_2O_3$ particles, in an amount greater than 5%, preferably greater than 10%, and/or less than 45%, preferably less than 35%, preferably less than 30%, preferably less than 25%, preferably less than 20%, by mass based on the mass of the starting feed. Preferably, said alumina powder is a reactive alumina powder and/or a calcined alumina powder and/or a transition alumina powder. Preferably said alumina powder is a reactive alumina powder.

In a third embodiment, the starting feed comprises a silica powder, i.e. $SiO_2$ particles, in an amount preferably greater than 0.5%, preferably greater than 1%, and/or less than 6%, preferably less than 5%, preferably less than 4%, preferably less than 3%, preferably less than 2%, in mass percentage based on the mass of the starting feed. The glass powder containing MgO and/or $SiO_2$, and/or the glass-ceramic powder containing MgO preferably contain more than 40%, preferably more than 50%, or even more than 60%, or even more than 70%, or even more than 80% by mass of silica.

The compound containing MgO and $SiO_2$ also preferably contains $Al_2O_3$. Preferably, said compound is selected from talc, cordierite and mixtures thereof. Preferably, said compound is cordierite.

In a fourth embodiment, the starting feed contains cordierite in an amount preferably greater than 0.5%, preferably greater than 1%, preferably greater than 1.5%, and/or less than 15%, preferably less than 10%, preferably less than 8%, preferably less than 6%, preferably less than 5%, preferably less than 4%, preferably less than 3%, in mass percentage based on the mass of the starting feed.

In a fifth embodiment, the starting feed contains a clay, preferably in an amount greater than 0.5%, preferably greater than 1%, preferably greater than 1.5%, and/or less than 5%, preferably less than 4%, preferably less than 3%.

In an embodiment, the first to fifth embodiments described immediately above are combined.

The powders providing oxides or the precursors are preferably selected so that the total content of oxides other than $ZrO_2$, $HfO_2$, $SiO_2$, $Al_2O_3$, MgO, CaO, $CeO_2$ and $Y_2O_3$ is less than 5%, in mass percentage based on oxides.

Preferably, no raw materials other than powders of zircon $ZrSiO_4$, of stabilized zirconia $ZrO_2$, optionally of alumina $Al_2O_3$, of glass containing MgO and/or $SiO_2$, and/or of glass-ceramic containing MgO, and/or of compound containing MgO and $SiO_2$ are voluntarily introduced into the starting feed, the other oxides present being impurities.

The starting feed may also include a solvent, preferably water, the amount of which is adapted to the shaping method in step d).

As is well known to the skilled person, the starting feed is adapted to the shaping process in step d).

Shaping can in particular result from a gelation process. For this purpose, a solvent, preferably water, is added to the starting feed in order to achieve a suspension.

The suspension preferably has a dry matter content by mass of between 50% and 70%.

The suspension may further include one or more of the following components:
- a dispersant, at a rate of 0 to 10%, in mass percentage based on dry matter;
- a surface tension modifier, at a rate of 0 to 3%, in mass percentage based on dry matter;
- a gelling agent, at a rate of 0 to 2%, in mass percentage based on dry matter.

The dispersants, surface tension modifiers and gelling agents are well known to the skilled person.

Examples include,
- as dispersants, the family of sodium or ammonium polymethacrylates, the family of sodium or ammonium polyacrylates, the family of citrates, for example ammonium, the family of sodium phosphates, and the family of carbonic acid esters;
- as surface tension modifiers, organic solvents such as aliphatic alcohols;
- as gelling agents, natural polysaccharides.

The oxide and/or precursor powders are preferably added in a mixture of water and dispersants/deflocculants in a ball mill. After stirring, water is added in which a gelling agent has previously been dissolved in order to obtain a suspension.

If the shaping is the result of extrusion, thermoplastic polymers or thermosetting polymers can be added to the starting feed.

In step d), any conventional shaping process known to be used for the manufacture of sintered beads can be used.

Examples of these processes include:
- granulation processes, such as granulators, fluidized bed granulators or granulation disks,
- gelation processes,
- injection or extrusion molding processes, and
- pressing processes.

In a gelation process, droplets of the suspension described above are obtained by flowing the suspension through a calibrated orifice. The droplets coming out of the orifice fall into a bath of a gelation solution (electrolyte adapted to react with the gelling agent) where they harden after having recovered a substantially spherical shape.

In step e), optional, the raw beads obtained in the previous step are washed, for example with water.

In step f), optional, the raw beads, possibly washed, are dried, for example in an oven.

In step g), the raw beads, possibly washed and/or dried, are sintered. Preferably, sintering is carried out under air, preferably in an electric furnace, preferably at atmospheric pressure.

Sintering in step g) is carried out at a temperature above 1330° C., preferably above 1340° C., preferably above 1350° C., preferably above 1360° C., preferably above 1370° C., and below 1450° C., preferably below 1430° C., preferably below 1410° C., preferably below 1400° C., preferably below 1390° C. A sintering temperature of 1375° C. is well suited. A sintering temperature below 1330° C. does not produce a particle with a total porosity of 6% or less. On the other hand, a sintering temperature above 1450° C. causes too much dissociation of zircon, which is detrimental to wear resistance.

Preferably, the sintering time is between 2 and 5 hours. A sintering time of 4 hours is well suited.

The sintered beads obtained preferably have a smaller diameter greater than 0.005 mm, preferably greater than 0.5 mm and less than 10 mm, preferably less than 2.5 mm.

If the relationships (1) and (2) are not respected, the wear resistance is not improved. These relationships make it possible to define a condition on the total amount of $CeO_2$ and $Y_2O_3$ as a function of the amount of $ZrO_2$ provided substantially exclusively by the stabilized zirconia.

Thus, relationship (1) expresses that $Y_2O_3$ and $CeO_2$ are present in an amount theoretically adapted to stabilize all zirconia present, and relationship (2) expresses the absence of compounds different from stabilized zirconia and comprising, in oxide form, zirconium and yttrium or comprising, in oxide form, zirconium and cerium.

The sintered beads according to the invention are particularly well suited as grinding agents or wet dispersion agents, as well as for surface treatment. The invention therefore also relates to the use of a bead powder according to the invention, or beads manufactured according to a process according to the invention, as grinding agents, or dispersion agents in a wet environment.

The properties of the beads according to the invention, in particular their mechanical strength, density and ease of production, make them suitable for other applications, in particular as supporting or heat exchange agents, or for surface treatment (by spraying the beads according to the invention in particular).

The invention therefore further relates to a device selected from a suspension, a grinder, a surface treatment apparatus and a heat exchanger, said device comprising a bead powder according to the invention.

EXAMPLES

The following non-limiting examples are provided for the purpose of illustrating the invention.

Measurement Protocols

The following methods were used to determine some properties of different sintered bead mixtures. They provide an excellent simulation of the actual operating behavior in the microgrinding application.

To determine the sphericity of a bead, the smaller and larger Feret diameters are measured on a Camsizer XT marketed by Horiba.

To determine the so-called "planetary" wear resistance, 20 ml (volume measured with a measuring cylinder) of beads to be tested with a size between 1.6 and 2.0 mm are weighed (mass $m_0$) and introduced into one of the 4 bowls coated with dense sintered alumina, 125 ml capacity, of a high-speed planetary mill (PM400, RETSCH). In the same bowl already containing the beads, 2.2 g of Presi brand silicon carbide (with a median size $D_{50}$ of 23 µm) and 40 ml of water are added. The bowl is closed and rotated (planetary movement) at 400 rpm with reversal of the direction of rotation every minute for 1.5 h. The bowl contents are then washed on a 100 µm screen to remove residual silicon carbide and material tears due to wear during grinding. After sieving on a 100 µm sieve, the beads are dried in an oven at 100° C. for 3 hours and then weighed (mass $m_1$). Said beads (mass $m_1$) are again introduced into one of the bowls with a suspension of SiC (same concentration and amount as before) and undergo a new grinding cycle, identical to the previous one. The bowl contents are then washed on a 100 µm screen to remove residual silicon carbide and material tears due to wear during grinding. After sieving on a 100 µm sieve, the beads are dried in an oven at 100° C. for 3 h and then weighed (mass $m_2$). Said beads (mass $m_2$) are again introduced into one of the bowls with a suspension of SiC (same concentration and amount as before) and undergo a new grinding cycle, identical to the previous one. The contents of the bowl are then washed on a 100 µm screen to remove residual silicon carbide and material tears due to wear during grinding. After sieving on a 100 µm sieve, the beads are dried in an oven at 100° C. for 3 h and then weighed (mass $m_3$).

Planetary wear (PW) is expressed as a percentage (%) and is equal to the loss of bead mass in relation to the initial bead mass, i.e. $100(m_0-m_3)/(m_0)$; the PW result is given in Table 1.

The results are considered particularly satisfactory if the products have an improvement in planetary wear (PW) resistance of at least 15% compared to example 1, the reference example.

The quantification of the crystal phases present in the sintered beads according to the invention is carried out from samples of polished beads prepared according to the following method: for each of the examples, a substantially continuous monolayer of beads having a size between 1.6 and 2 mm is partially embedded in acrylic resin, at a temperature equal to 180° C.

The outer diameter of the resin block containing the beads is 25 mm.

The block is polished with an abrasive paper with a grain size of 65 µm until the center of the beads can be observed. The block is then polished more finely, the second last polishing step being carried out with a Mecaprex LD32-E 1 µm diamond preparation marketed by PRESI, and the last polishing step being carried out with a 0.04 µm colloidal silica solution.

The crystal phases present in the sintered beads according to the invention are measured by X-ray diffraction, for example using an X'Pert PRO diffractometer from Panalytical equipped with a copper DX tube. The acquisition of the diffraction diagram is performed from this equipment, over a 2θ-angle range of between 5° and 80°, with a step of 0.017°, and a counting time of 150 s/step. The front optics have a fixed ¼° programmable divergence slot used, 0.04 rad Soller slots, a mask equal to 10 mm and a fixed ½° anti-scattering slot. The sample is rotated on itself to limit preferential orientations. The rear optics have a fixed ¼° used programmable anti-scattering slot, a 0.04 rad Soller slot and a Ni filter.

The diffraction patterns were then qualitatively analyzed using EVA software and the ICDD2016 database.

Once the present phases were identified, the diffraction patterns were analyzed quantitatively with High Score Plus software by Rietveld refinement according to the following strategy:

- A refinement of the background signal is performed using the "treatment" function, "determine background" with the following choices: "bending factor" equal to 0 and "granularity" equal to 40. Note that if a resin-induced halo is observed, it is possible to manually draw the baseline point by point;
- Classically, the ICDD sheets of the present phases highlighted and quantifiable are selected, and therefore taken into account in the refinement;
- An automatic refinement is then performed by selecting the bottom signal previously determined "use available background" and selecting the mode "automatic: option phase fit-default Rietveld";
- A manual refinement of the "B overall" parameter of all selected phases is then performed simultaneously;
- Finally, a simultaneous manual refinement of the Caglioti parameter W of the quadratic zirconia and cubic zirconia phases is performed if the automatic function has not performed it. In this case, "W" is selected for said zirconia phases and refinement is performed again. The results are only kept if the "Goodness of fit" parameter of the second refinement is lower than that of the first refinement.

The amount of amorphous phase present in the sintered beads according to the invention is measured by X-ray diffraction, for example using an X'Pert PRO diffractometer from Panalytical equipped with a copper DX tube. The acquisition of the diffraction diagram is carried out from this equipment, in the same way as for the determination of the crystal phases present in the beads, the analyzed sample being in the form of a powder. The method applied consists of adding a known amount of a fully crystallized standard, in this case a zinc oxide ZnO powder in an amount equal to 20%, based on the mass of zinc oxide and sample of ground sintered beads according to the invention. The maximum size of the zinc oxide powder is 1 µm and the beads according to the invention are ground to obtain a powder with a maximum size of less than 40 µm.

The maximum size of the ZnO particles is entered into the High Score Plus software to limit microabsorption effects.

The amorphous phase rate, in percent, is calculated using the following formula, $Q_{ZnO}$ being the amount of ZnO determined from the diffraction diagram:

$$\text{Amorphous phase rate} = 100*(100/(100-20))*(1-(20/Q_{ZnO}))$$

For example, if $Q_{ZnO}$ is equal to 22%, then the amorphous phase rate is equal to $100*(100/(100-20))*(1-(20/22))=11.4\%$.

The total porosity, in %, is evaluated by the following formula:

$$\text{Total porosity} = 100*(1-(d_{beads}/d_{ground\ beads})), \text{ with}$$

$d_{beads}$, the density on unground beads obtained using a helium pycnometer (AccuPyc 1330 from Micromeritics®), using a method based on the measurement of the volume of helium displaced, and $d_{ground\ beads}$ is the density on powder resulting from the grinding of the beads carried out with an Aurec ring type dry mill for 40 s and followed by sieving to retain for the measurement only the powder passing through a 160 µm sieve.

Manufacturing Protocol

Sintered beads were prepared from:

- a zircon powder, having a specific surface area of about 8 $m^2/g$, a median size of 1.5 µm and a total oxide content other than $ZrO_2$ and $SiO_2$ of 1.1%,
- a cordierite powder with a purity greater than 95% and a median size of less than 63 µm,
- a clay powder of a median size of less than 53 µm, having a loss on ignition at 1000° C. of between 10% and 15% and having a total $SiO_2+Al_2O_3$ content of more than 82%,
- a silica powder with a purity of more than 98.5% and a median size of 1.5 µm, and, depending on the examples produced,
- an alumina powder of 99.5% purity and a median size of less than 5 µm,
- a cerium oxide powder with a purity of more than 99.5% and a median size of 2.8 µm,
- an unstabilized zirconia powder CZ-5, marketed by Saint-Gobain ZirPro and in monoclinic crystallographic form,
- a stabilized zirconia powder CY3Z marketed by Saint-Gobain ZirPro, having a molar content of $Y_2O_3$ equal to 3% and being mainly in a quadratic crystallographic form, and a stabilized zirconia powder TZ-10Y, marketed by TOSOH, having a molar content of $Y_2O_3$ equal to 10% and being in a substantially entirely cubic crystallographic form.

Table 1 summarizes the starting feeds of the examples.

These powders were mixed and then co-ground in a wet environment until a particulate mixture with a median size of less than 0.4 μm was obtained. The particulate mixture was then dried.

A starting feed consisting of an aqueous suspension comprising, in percentages by mass percentage on a dry matter basis, 0.5% of a carboxylic acid dispersant, 0.6% of a sodium phosphate dispersant and 0.4% of a gelling agent, namely a polysaccharide of the alginate family, was then prepared from this particulate mixture.

A ball mill was used for this preparation in order to obtain a good homogeneity of the starting feed: A solution containing the gelling agent was first formed. Subsequently, the particulate mixture and dispersants were added to water. The solution containing the gelling agent was then added. The resulting mixture was stirred for 8 hours. The particle size was controlled by sedigraphy using a Sedigraph 5100 sedigraph marketed by Micromeritics® (median size<0.4 μm), and water was added in a determined amount to obtain an aqueous suspension at 68% dry matter and a viscosity, measured with the Brookfield viscometer using the LV3 spindle at a speed equal to 20 rpm, less than 5000 centipoise. The pH of the suspension was then about 9 after adjustment with a strong base.

The suspension was forced through a calibrated hole and at a flow rate that would produce after sintering beads of about 1.6 mm to 2.0 mm in the context of this example. The droplets of suspension fell into a gelation bath based on an electrolyte (divalent cation salt), reacting with the gelling agent. The raw beads were collected, washed and dried at 80° C. to remove moisture. The beads were then transferred to a sintering furnace where they were heated at a rate of 100° C./h to a temperature of 1375° C. At the end of a 4-hour period at this temperature, the temperature decrease was achieved by natural cooling.

Results The results obtained are summarized in Table 2.

TABLE 1

Composition of the particulate mixture

| | Examples | | | | | | | | |
|---|---|---|---|---|---|---|---|---|---|
| | 1(*) | 2 | 3 | 4 | 5(*) | 6 | 7 | 8 | 9 |
| Zircon powder | — | 60.2 | 50.2 | 45.2 | 55.2 | 55.2 | 84.2 | 25.2 | 45.2 |
| Zirconia powder CZ-5 | — | — | — | — | 34 | — | — | — | 17.2 |
| Stabilized zirconia powder CY3Z | — | — | — | — | — | 34 | — | — | — |
| Stabilized zirconia powder TZ-10Y | — | 34 | 34 | 34 | — | — | 5 | 34 | 11.8 |
| Alumina powder | — | — | 10 | 15 | 5 | 5 | 5 | 35 | 15 |
| Silica powder | — | 1.4 | 1.4 | 1.4 | 1.4 | 1.4 | 1.4 | 1.4 | 1.4 |
| Cordierite powder | — | 1.9 | 1.9 | 1.9 | 1.9 | 1.9 | 1.9 | 1.9 | 1.9 |
| Clay powder | — | 2.5 | 2.5 | 2.5 | 2.5 | 2.5 | 2.5 | 2.5 | 2.5 |
| Cerium oxide powder | — | — | — | — | — | — | — | — | 5 |

(*)prior art

TABLE 2

| | Examples | | | | | | | | |
|---|---|---|---|---|---|---|---|---|---|
| | 1(*) | 2 | 3 | 4 | 5(*) | 6 | 7 | 8 | 9 |
| Chemical analysis, in percentages by mass based on oxides | | | | | | | | | |
| $ZrO_2 + HfO_2$ (%) | 57 | 66.7 | 59.6 | 56.5 | 69.8 | 67.3 | 59.2 | 44.7 | 54.3 |
| $SiO_2$ (%) | 37 | 23.8 | 20.4 | 18.5 | 21.4 | 21.3 | 30.5 | 11.6 | 19.2 |
| $Al_2O_3$ (%) | 3 | 1.8 | 11.9 | 16.8 | 6.7 | 6.6 | 6.7 | 36.3 | 17.2 |
| $Y_2O_3$ (%) | — | 6 | 5.9 | 5.9 | 0.1 | 1.9 | 1.1 | 5.5 | 2.2 |
| CaO (%) | — | 0.7 | 0.6 | 0.6 | 0.8 | 0.9 | 1 | 0.6 | 0.6 |
| $CeO_2$ (%) | — | — | — | — | — | — | — | — | 5.4 |
| MgO (%) | 0.4 | 0.2 | 0.2 | 0.2 | 0.2 | 0.2 | 0.2 | 0.2 | 0.2 |
| Other oxides (%) | 2.6 | 0.8 | 1.4 | 1.5 | 1.0 | 1.8 | 1.3 | 1.1 | 0.9 |
| of which $P_2O_5$ (%) | — | 0.5 | 0.5 | 0.5 | 0.6 | 0.6 | 0.5 | 0.5 | 0.4 |
| Z | — | 30.0 | 29.3 | 30.5 | 27.7 | 29.6 | 8.2 | 32.4 | 32.1 |
| $CeO_2 + 3.76*Y_2O_3 \geq 0.128*Z$? | — | yes | yes | yes | no | yes | yes | yes | yes |
| $CeO_2 + 1.3*Y_2O_3 \leq 0.318*Z$? | — | yes | yes | yes | yes | yes | yes | yes | yes |
| Crystal phases, in % by mass based on the mass of the crystal phases | | | | | | | | | |
| Zircon (%) | 100 | 68 | 57 | 50 | 66 | 59 | 85 | 28 | 47 |
| Monoclinic zirconia (%) | — | — | — | — | 30 | 26 | 5 | — | 10 |
| Stabilized zirconia (%) | — | 32 | 31 | 32 | — | 9 | 4 | 34 | 24 |
| Corundum (%) | 0 | — | 12 | 18 | 4 | 6 | 6 | 38 | 19 |
| Other crystal phases (%) | — | — | — | — | — | — | — | — | — |

TABLE 2-continued

|  | Examples | | | | | | | | |
| --- | --- | --- | --- | --- | --- | --- | --- | --- | --- |
|  | 1(*) | 2 | 3 | 4 | 5(*) | 6 | 7 | 8 | 9 |
|  | Characteristics | | | | | | | | |
| Total porosity (%) | — | 0.8 | 1 | 1.5 | 2 | 1.2 | 1.5 | 5.9 | 1.1 |
| Bead density | 4.20 | 4.70 | 4.58 | 4.52 | 4.63 | 4.58 | 4.30 | 4.23 | 4.5 |
| Planetary wear PW (in %) | 4.5 | 1.9 | 1.6 | 1.4 | 15.9 | 2.8 | 3.4 | 0.9 | 1.4 |
| PW % improvement/example 1 | — | 58% | 64% | 69% | 253% | 38% | 24% | 80% | 69% |

(*)prior art

The bead powders in the examples have an average sphericity greater than 0.9.

The beads in examples 2 to 9 have an amorphous phase amount of less than 20% by mass.

The reference beads in example 1, of the prior art, are sintered zircon beads commonly used in grinding applications, whose composition is similar to that of example 4 of US 2004/007789.

$$Z=Z_4+Z_5+Z_6-(0.67*Z_1*(Z_4+Z_5+Z_6)/(0.67*Z_1+Z_2+Z_3))$$

For example, for example 2, Z is determined as follows:

$$Z=0.667+0.06+0-(0.67*0.68*(0.667+0.06+0)/(0.67*0.68+0.32+0))=0.3, \text{ or } 30\%.$$

The verification of conditions (1) and (2) is determined as follows:
0.128*Z is equal to 0.128*30=3.84 and 0.318*Z is equal to 0.318*30=9.54.
$CeO_2+3.76*Y_2O_3$ is equal to 0+3.76*6=22.56, which is well above 3.84 (0.128*Z): condition (1) is indeed verified for example 2.
$CeO_2+1.3*Y_2O_3$ is equal to 0+1.3*6=7.8, which is well below 9.54 (0.318*Z): condition (2) is indeed verified for example 2.

A comparison of prior art example 1 and of example 2 according to the invention shows a 58% reduction in planetary wear PW by 58%, notably obtained thanks to the addition of zirconia stabilized with $Y_2O_3$ and substantially entirely cubic.

A comparison of prior art example 1 and of example 6 according to the invention shows a 38% reduction in planetary wear PW, mainly due to the addition of stabilized zirconia, mainly in a quadratic crystallographic form.

A comparison of examples 1, 2 and 6 shows that surprisingly, it is preferable to add a stabilized zirconia that is substantially entirely cubic rather than a stabilized zirconia that is mainly in a quadratic crystallographic form: wear is equal to 1.9% and 2.8%, respectively, compared to wear in example 1 equal to 4.5%.

A comparison of the examples according to invention 2 to 4 shows a decrease in wear PW and a decrease in density with the increase in alumina addition.

A comparison of prior art examples 1 and 5 shows that wear PW is degraded by adding 34% of an unstabilized zirconia powder.

A comparison of examples 1 and 7, 8 and 9 shows a decrease in wear PW for beads according to the invention with a $SiO_2$ content of 30.5%, an $Al_2O_3$ content of 36.3%, and with a $Y_2O_3$- and $CeO_2$-stabilized zirconia, respectively.

The examples show that, surprisingly, the beads according to the invention tested have outstanding performance compared to the reference beads.

The invention claimed is:

1. A sintered bead with:
the following crystal phases, in percentages by mass based on crystal phases and for a total of 100%:
25%≤zircon, or "$Z_1$", ≤94%;
10%≤stabilized zirconia+stabilized hafnia, or "$Z_2$", ≤61%;
monoclinic zirconia+monoclinic hafnia, or "$Z_3$", ≤50%;
corundum≤57%;
crystal phases other than $Z_1$, $Z_2$, $Z_3$ and corundum<10%;
the following chemical composition, in percentages by mass based on oxides and for a total of 100%:
33%≤$ZrO_2+HfO_2$, or "$Z_4$", ≤83.4%;
$HfO_2$≤2%;
10.6%≤$SiO_2$≤34.7%;
$Al_2O_3$≤50%;
0%≤$Y_2O_3$, or "$Z_5$";
0%≤$CeO_2$, or "$Z_6$";
0.3%≤$CeO_2+Y_2O_3$≤19%, provided that
(1) $CeO_2+3.76*Y_2O_3$≥0.128*Z, and
(2) $CeO_2+1.3*Y_2O_3$≤0.318*Z,
with $Z=Z_4+Z_5+Z_6-(0.67*Z_1*(Z_4+Z_5+Z_6)/(0.67*Z_1+Z_2+Z_3))$;
MgO≤5%;
CaO≤2%;
oxides other than $ZrO_2$, $HfO_2$, $SiO_2$, $Al_2O_3$, MgO, CaO, $CeO_2$ and $Y_2O_3$<5.0%.

2. The sintered bead as claimed in claim 1, wherein $Al_2O_3$≤35%, 37%≤$ZrO_2+HfO_2$ and 12.6%≤$SiO_2$, in percentages by mass based on oxides, and having a corundum content of 40% or less and a zircon content of 31% or more, in percentages by mass based on the total amount of crystal phases.

3. The sintered bead as claimed in claim 1, wherein 50%≤$ZrO_2+HfO_2$ and/or $SiO_2$>14% and/or $Al_2O_3$>5% and/or MgO>0.1% and/or CaO>0.1%.

4. The sintered bead as claimed in claim 1, wherein 25%>$Al_2O_3$>10%.

5. The sintered bead as claimed in claim 1, wherein 1.0%>MgO>0.15%.

6. The sintered bead as claimed in claim 1, wherein 1.0%>CaO>0.2%.

7. The sintered bead as claimed in claim 1, wherein the $CeO_2+Y_2O_3$ content is greater than 2.2%, in percentages by mass based on oxides.

8. The sintered bead as claimed in claim 7, wherein the $CeO_2+Y_2O_3$ content is greater than 3%, in percentages by mass based on oxides.

9. The sintered bead as claimed in claim 1, wherein $CeO_2+2.39*Y_2O_3$≥0.212*Z.

10. The sintered bead as claimed in claim 9, wherein $CeO_2+1.84*Y_2O_3$≥0.224*Z.

11. The sintered bead as claimed in claim 10, wherein $CeO_2+1.76*Y_2O_3 \geq 0.229*Z$.

12. The sintered bead as claimed in claim 1, wherein the $CeO_2+Y_2O_3$ content is less than 15.5%, in percentages by mass based on oxides.

13. The sintered bead as claimed in claim 12, wherein the $CeO_2+Y_2O_3$ content is less than 11.6%, in percentages by mass based on oxides.

14. The sintered bead as claimed in claim 1, wherein $CeO_2+1.4*Y_2O_3 \leq 0.259*Z$.

15. The sintered bead as claimed in claim 1, wherein the $CeO_2$ content is less than 0.2%.

16. The sintered bead as claimed in claim 1, wherein $Y_2O_3 \geq 3.44*Z$.

17. The sintered bead as claimed in claim 1, wherein the content of oxides other than $ZrO_2$, $HfO_2$, $SiO_2$, $Al_2O_3$, $Y_2O_3$, $CeO_2$, CaO, MgO is less than 2%, in percentages by mass based on oxides.

18. A sintered bead as claimed in claim 1, wherein the oxide content represents more than 99% of the total mass of said bead.

19. The sintered bead as claimed in claim 1, having a zircon content of more than 35% and less than 90%, in percentage by mass based on the total amount of crystal phases.

20. The sintered bead as claimed in claim 19, wherein the zircon content is less than 68%, in percentage by mass based on the total amount of crystal phases.

21. The sintered bead as claimed in claim 1, having a stabilized zirconia+hafnia content of less than 50%, in percentage by mass based on the total amount of crystal phases.

22. The sintered bead as claimed in claim 21, wherein the content of stabilized zirconia+hafnia is greater than 27% and less than 47%, in percentage by mass based on the total amount of crystal phases.

23. The sintered bead as claimed in claim 1, wherein the zirconia+monoclinic hafnia content is less than 35%, in percentage by mass based on the total amount of crystal phases.

24. The sintered bead as claimed in claim 23, wherein the content of zirconia+monoclinic hafnia is less than 10%, in percentage by mass based on the total amount of crystal phases.

25. The sintered bead as claimed in claim 1, having a corundum content of more than 10% and less than 25%, in percentage by mass based on the total amount of crystal phases.

26. A sintered bead as claimed in claim 1, having a content of crystal phases other than zircon, stabilized zirconia, stabilized hafnia, stabilized zirconia, monoclinic hafnia and corundum of less than 8%, in percentage by mass based on the total amount of crystal phases.

27. The sintered bead as claimed in claim 26, wherein the mullite content is substantially zero.

28. The sintered bead as claimed in claim 1, having a mass amount of amorphous phase, in percentage by mass based on the mass of the bead, of less than 25%.

29. The sintered bead as claimed in claim 28, wherein the amorphous phase, expressed as oxide, comprises
MgO and $SiO_2$, and/or
$Y_2O_3$ and/or
$Al_2O_3$ and/or
CaO and/or
$Na_2O$ and/or
$K_2O$ and/or
$P_2O_5$.

30. The sintered bead as claimed in claim 29, wherein the amorphous phase, expressed as oxide, comprises MgO and $SiO_2$ and $Y_2O_3$ and $Al_2O_3$ and $Na_2O$ and $K_2O$ and $P_2O_5$.

31. The sintered bead as claimed in claim 1, having a total porosity of less than 6%.

32. The sintered bead as claimed in claim 1, having a sphericity greater than 0.7.

33. The sintered bead as claimed in claim 32, having a sphericity greater than 0.85.

34. The sintered bead as claimed in claim 1, having a size of less than 10 mm and greater than 0.005 mm.

35. A powder comprising more than 90% in percentages by mass of beads as claimed in claim 1.

36. A device selected from a suspension, a grinder, a surface treatment apparatus and a heat exchanger, said device comprising a bead powder as claimed in claim 35.

37. A process for manufacturing sintered beads as claimed in claim 1, comprising the following successive steps:
a) optionally, grinding one or more raw material powders, and dosing said optionally ground raw material powders,
so as to obtain a particulate mixture having a median size of less than 0.6 μm, and a composition suitable for obtaining, at the end of step g), sintered beads having a composition in accordance with that of a sintered bead as claimed in claim 1,
the particulate mixture comprising
zircon particles and stabilized zirconia particles and particles of a glass containing MgO and/or $SiO_2$, and/or particles of a glass-ceramic containing MgO and/or particles of a compound containing MgO and $SiO_2$,
b) optionally, drying said particulate mixture,
c) preparing a starting feed from said particulate mixture, optionally dried,
d) shaping the starting feed in the form of raw beads,
e) optionally, washing the raw beads,
f) optionally, drying the raw beads, optionally washed,
g) sintering the raw beads, optionally dried and/or washed, at a sintering temperature above 1330° C. and below 1450° C. to obtain sintered beads.

38. The process as claimed in claim 37, wherein, in step c), no raw material other than powders of zircon $ZrSiO_4$, of stabilized zirconia $ZrO_2$, optionally of alumina $Al_2O_3$, of glass containing MgO and/or $SiO_2$, and/or of glass-ceramic containing MgO, and/or of compound containing MgO and $SiO_2$ is voluntarily introduced into the starting feed.

39. The process as claimed in claim 37, wherein, in step c), the stabilized zirconia powder is a $Y_2O_3$-stabilized zirconia powder and contains substantially no $CeO_2$.

40. The process as claimed in claim 37, wherein, in step c), the stabilized zirconia powder is stabilized in cubic crystallographic form.

41. The sintered bead as claimed in claim 1, wherein the $CeO_2$ content is less than 0.1%.

42. The sintered bead as claimed in claim 1, wherein $Y_2O_3 \geq 5.38*Z$.

* * * * *